(12) United States Patent
Mouri et al.

(10) Patent No.: US 10,253,876 B2
(45) Date of Patent: Apr. 9, 2019

(54) VEHICLE REGENERATIVE SPEED CONTROL DEVICE

(71) Applicant: Nissan Motor Co., Ltd., Yokohama-shi, Kanagawa (JP)

(72) Inventors: Takanobu Mouri, Kanagawa (JP); Takahiro Yoshino, Kanagawa (JP); Yuuzou Kageyama, Kanagawa (JP); Masashi Ono, Kanagawa (JP); Hideki Maruyama, Kanagawa (JP); Takuya Ishizuka, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 15/556,374

(22) PCT Filed: Mar. 20, 2015

(86) PCT No.: PCT/JP2015/058406
§ 371 (c)(1),
(2) Date: Sep. 7, 2017

(87) PCT Pub. No.: WO2016/151662
PCT Pub. Date: Sep. 29, 2016

(65) Prior Publication Data
US 2018/0106367 A1    Apr. 19, 2018

(51) Int. Cl.
*F16H 61/06*    (2006.01)
*B60K 6/442*   (2007.10)
(Continued)

(52) U.S. Cl.
CPC ............. *F16H 61/06* (2013.01); *B60K 6/442* (2013.01); *B60K 6/543* (2013.01); *B60W 10/06* (2013.01);
(Continued)

(58) Field of Classification Search
CPC ...... F16H 61/06; F16H 61/662; B60W 20/10; B60W 30/18127
See application file for complete search history.

(56) References Cited

U.S. PATENT DOCUMENTS

2003/0176256 A1* 9/2003 Kamichi .................. B60K 6/48
477/5
2004/0029678 A1* 2/2004 Kayukawa ............. B60K 6/365
477/15
(Continued)

FOREIGN PATENT DOCUMENTS

CN   101900192 A   12/2010
CN   101905648 A   12/2010
(Continued)

*Primary Examiner* — Edwin A Young
(74) *Attorney, Agent, or Firm* — Global IP Counselors, LLP

(57) ABSTRACT

A vehicle regenerative speed control device is provided for suppressing undershooting, in which an actual transmission input rotational speed falls below a lower-limit rotational speed, when decreasing a transmission input rotational speed based on a request for a decrease in the regeneration amount during regenerative speed control. The vehicle regenerative speed control device includes a controller which performs a regenerative speed control for downshifting a continuously variable transmission to a low gear ratio side and increasing a rotational speed of a transmission input shaft to which a motor generator is connected when there is a request for an increase in the regeneration amount while decelerating.

4 Claims, 6 Drawing Sheets

(51) Int. Cl.

| | | |
|---|---|---|
| *B60K 6/543* | (2007.10) |
| *B60W 10/10* | (2012.01) |
| *B60W 10/18* | (2012.01) |
| *B60W 20/00* | (2016.01) |
| *F16H 61/662* | (2006.01) |
| *B60W 10/115* | (2012.01) |
| *B60W 20/30* | (2016.01) |
| *F16H 61/02* | (2006.01) |
| *B60W 10/06* | (2006.01) |
| *B60W 10/08* | (2006.01) |
| *B60W 10/107* | (2012.01) |
| *B60W 10/184* | (2012.01) |
| *B60W 10/26* | (2006.01) |
| *B60W 10/30* | (2006.01) |
| *B60W 30/18* | (2012.01) |
| *B60W 20/14* | (2016.01) |
| *B60K 6/48* | (2007.10) |
| *B60K 6/26* | (2007.10) |

(52) U.S. Cl.
CPC ............ *B60W 10/08* (2013.01); *B60W 10/10* (2013.01); *B60W 10/107* (2013.01); *B60W 10/115* (2013.01); *B60W 10/18* (2013.01); *B60W 10/184* (2013.01); *B60W 10/26* (2013.01); *B60W 10/30* (2013.01); *B60W 20/00* (2013.01); *B60W 20/14* (2016.01); *B60W 20/30* (2013.01); *B60W 30/18127* (2013.01); *F16H 61/0272* (2013.01); *F16H 61/662* (2013.01); *B60K 6/48* (2013.01); *B60K 2006/268* (2013.01); *B60K 2006/4825* (2013.01); *B60W 2510/082* (2013.01); *B60W 2520/10* (2013.01); *B60W 2540/12* (2013.01); *B60W 2710/082* (2013.01); *B60Y 2300/89* (2013.01); *Y02T 10/6221* (2013.01); *Y02T 10/6252* (2013.01); *Y02T 10/6286* (2013.01); *Y02T 10/7258* (2013.01)

(56) References Cited

U.S. PATENT DOCUMENTS

2014/0129067 A1* 5/2014 Furukawa .............. B60K 6/442
                                                                                                      701/22

2014/0148985 A1    5/2014  Sato et al.

FOREIGN PATENT DOCUMENTS

| | | |
|---|---|---|
| CN | 102458945 A | 5/2012 |
| CN | 103386969 A | 11/2013 |
| JP | 2007-50866 A | 3/2007 |
| JP | 2009-298202 A | 12/2009 |
| JP | 2010-58557 A | 3/2010 |
| JP | 2013-86649 A | 5/2013 |
| WO | 2013/058139 A1 | 4/2013 |

* cited by examiner

VEHICLE REGENERATIVE SPEED CONTROL DEVICE

CROSS-REFERENCE TO RELATED APPLICATIONS

This application is a U.S. National stage application of International Application No. PCT/JP2015/058406, filed Mar. 20, 2015.

BACKGROUND

Field of the Invention

The present invention relates to a vehicle regenerative speed control device that increases the rotational speed of a transmission input shaft, to which an electric motor is connected, by downshifting a continuously variable transmission, when there is a request for an increase in the regeneration amount during deceleration.

Background Information

Conventionally, a hybrid vehicle control device is known, which executes downshifting to increase the transmission ratio of the transmission when executing regenerative control, in order to improve the regenerative efficiency (for example, refer to Patent Document 1-Japanese Laid Open Patent Application No. 2007-50866).

SUMMARY

However, in the conventional device, when there is a request for a decrease in the regeneration amount during regenerative speed control and the transmission input rotational speed decreases, the decrease is carried out by upshifting, contrary to downshifting, which increases the transmission input rotational speed. When the upshifting is carried out, the rotational speed decreases with a good response in the same manner as downshifting, and the rotational speed decrease change rate of the transmission input rotational speed is increased. In addition, if a feedback transmission control is carried out, in which the lower-limit rotational speed (=rotational speed of an oil pump that produces the necessary hydraulic pressure to the transmission) is set as the target rotational speed, the follow-up response of the actual transmission input rotational speed with respect to the transmission input rotational speed command value is delayed. Consequently, there is the problem that, when decreasing the transmission input rotational speed based on a request for a decrease in the regeneration amount, undershooting occurs, in which the actual transmission input rotational speed falls below the lower-limit rotational speed.

In view of the problems described above, an object of the present invention is to provide a vehicle regenerative speed control device for suppressing undershooting, in which actual transmission input rotational speed falls below the lower-limit rotational speed, when decreasing the transmission input rotational speed based on a request for a decrease in the regeneration amount during regenerative speed control.

In order to achieve the object above, the present invention comprises a continuously variable transmission, an electric motor connected to an input shaft of the continuously variable transmission and that regenerates energy during deceleration, and an oil pump connected to the input shaft side of the continuously variable transmission, in which a rotational speed for producing a necessary hydraulic pressure to the continuously variable transmission during deceleration is set as the lower-limit rotational speed. This vehicle is provided with a controller which, when there is a request for an increase in the regeneration amount while decelerating, performs a regenerative speed control for downshifting the continuously variable transmission to the low gear ratio side, and increasing the rotational speed of a transmission input shaft to which the electric motor is connected. The controller performs a control for making the rotational speed decrease change rate of the transmission input rotational speed lower than the rotational speed increase change rate of the transmission input rotational speed, when the transmission input rotational speed is decreased based on a request for a decrease in the regeneration amount during regenerative speed control.

Therefore, the controller performs a control for making the rotational speed decrease change rate of the transmission input rotational speed lower than the rotational speed increase change rate of the transmission input rotational speed, when the transmission input rotational speed is decreased based on a request for a decrease in the regeneration amount during regenerative speed control. That is, when decreasing the transmission input rotational speed based on a request for a decrease in the regeneration amount, the decrease occurs with a more gentle slope compared to when increasing the transmission input rotational speed, and reaches the lower-limit rotational speed with an opening angle that intersects the lower-limit rotational speed forming a large angle. Therefore, even if there is a follow-up response delay due to a feedback transmission control, it is possible to suppress undershooting, in which the actual transmission input rotational speed falls below the lower-limit rotational speed.

BRIEF DESCRIPTION OF THE DRAWINGS

Referring now to the drawings, a regenerative speed control device for hybrid vehicles is illustrated.

DETAILED DESCRIPTION OF THE EMBODIMENTS

Figure 1:
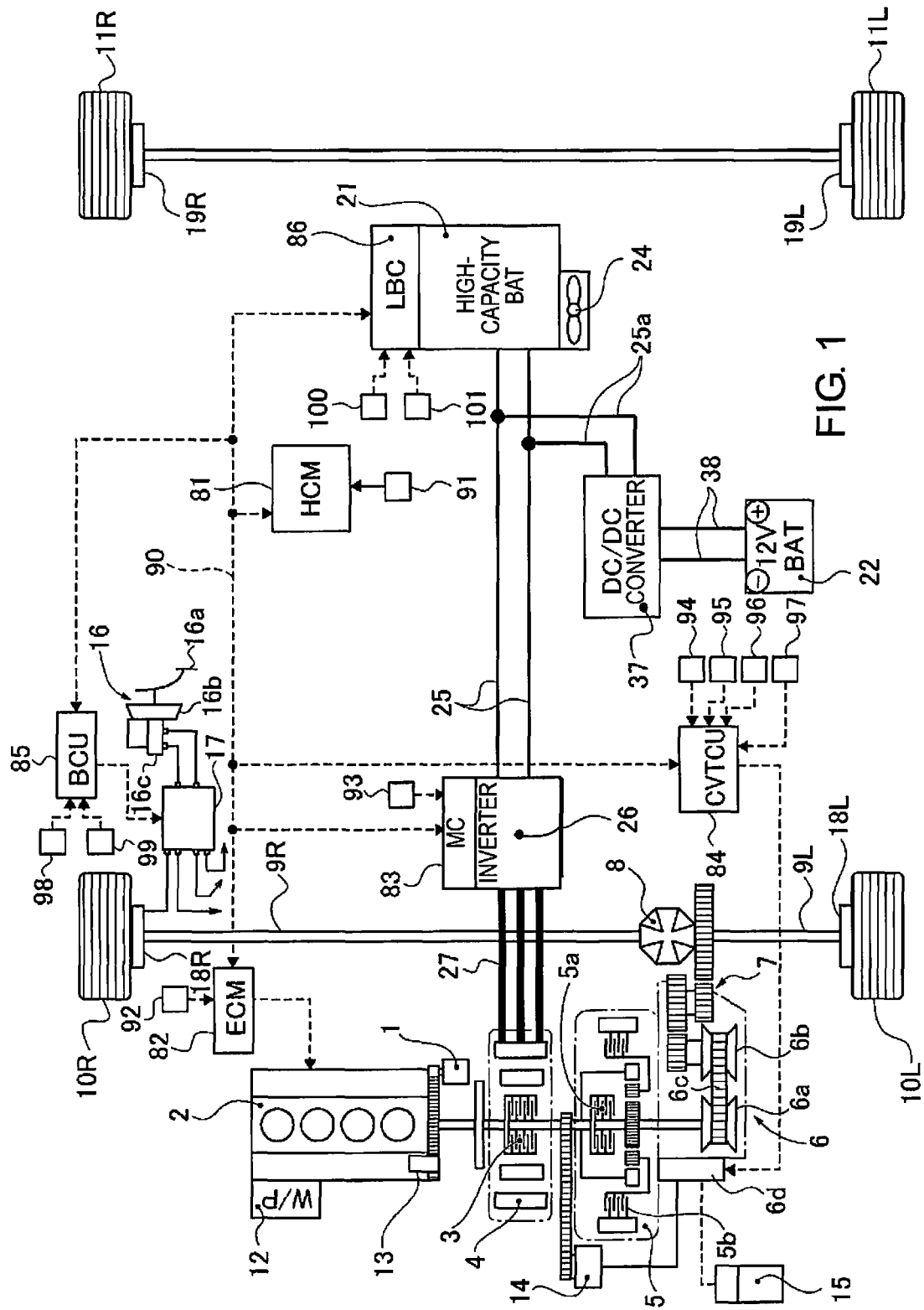
FIG. 1 is an overall schematic diagram illustrating an FF hybrid vehicle to which is applied the regenerative speed control device of a first embodiment.

A preferred embodiment for realizing a vehicle regenerative speed control device of the present invention is described below based on the first embodiment illustrated in the drawings.

First Embodiment

The configuration is described first. The regenerative speed control device according to the first embodiment is applied to an FF hybrid vehicle (one example of a vehicle), having left and right front wheels as drive wheels, and having a belt-type continuously variable transmission. The "overall system configuration" and the "configuration of the regenerative speed control process" will be separately described regarding the configuration of the regenerative speed control device for FF hybrid vehicles in the first embodiment.

Overall System Configuration

FIG. 1 illustrates an overall system view of an FF hybrid vehicle to which is applied the regenerative speed control device of the first embodiment. The overall system configuration of the FF hybrid vehicle will be described below, based on FIG. 1.

A drive system of an FF hybrid vehicle is provided with a transverse engine 2, a first clutch 3 (abbreviated as "CL1"), a motor-generator 4 (abbreviated as "MG"), a second clutch 5 (abbreviated as "CL2"), and a belt-type continuously variable transmission 6 (abbreviated as "CVT"), as illustrated in FIG. 1. An output shaft of the belt-type continuously variable transmission 6 is drivingly coupled to left and right front wheels 10R and 10L, via a final reduction gear train 7, a differential gear 8, and left and right drive shafts 9R and 9L. The left and right rear wheels 11R, 11L are configured as driven wheels.

The transverse engine 2 is an engine disposed at the front with a starter motor 1 and the crankshaft direction in the vehicle width direction, comprising an electric water pump 12, and a crankshaft rotation sensor 13 that detects a reverse rotation of the transverse engine 2. The transverse engine 2 comprises, as engine starting methods, an "MG start mode" that carries out cranking by the motor-generator 4 while slip-engaging the first clutch 3, and a "starter startup mode" that carries out cranking by a starter motor 1 that has a 12V battery 22 as the power source. The "starter startup mode" is selected only when limited conditions are met, such as extremely low temperature conditions.

The motor-generator 4 is a three-phase alternating current permanent magnet synchronous motor coupled to the transverse engine 2 via the first clutch 3. The motor-generator 4 uses a high-capacity battery 21, described later, as the power source, and an inverter 26, which converts direct current to three-phase alternating current during powering and converts three-phase alternating current to direct current during regeneration, is connected to the stator coil via an AC harness 27. The first clutch 3, interposed between the transverse engine 2 and the motor-generator 4, is a hydraulically actuated dry or wet multi-plate clutch, in which complete engagement/slip engagement/disengagement are controlled by the first clutch hydraulic pressure.

The second clutch 5 is a hydraulically actuated dry multi-plate friction clutch interposed between the motor-generator 4, and the left and right front wheels 10R and 10L, which are the drive wheels, in which complete engagement/slip engagement/disengagement are controlled by the second clutch hydraulic pressure. The second clutch 5 in the first embodiment is configured by diverting a forward clutch 5a and a reverse brake 5b provided in a forward/reverse switching mechanism configured by planetary gears. That is, the forward clutch 5a is used as the second clutch 5 during forward traveling, and the reverse brake 5b is used as the second clutch 5 during reverse traveling.

The belt-type continuously variable transmission 6 comprises a primary pulley 6a, a secondary pulley 6b, and a belt 6c that is wound around the two pulleys 6a and 6b. Furthermore, this continuously variable transmission is a transmission that achieves a stepless transmission ratio by changing the winding diameter of the belt 6c, by a primary pressure and a secondary pressure that are supplied to a primary oil chamber and a secondary oil chamber. The belt-type continuously variable transmission 6 comprises, as hydraulic power sources, a main oil pump 14 (mechanical drive) rotationally driven by a motor shaft of the motor-generator 4 (=transmission input shaft), and a sub oil pump 15 (motor drive) that is used as an auxiliary pump. The continuously variable transmission comprises a control valve unit 6d, which uses a line pressure PL, generated by adjusting the pump discharge pressure from the hydraulic power source, as the source pressure to produce a first clutch pressure, a second clutch pressure, as well as the primary pressure and the secondary pressure of the belt-type continuously variable transmission 6. The oil pump that is the target of the lower-limit rotational speed of the first embodiment is the main oil pump 14, which is rotationally driven by the motor-generator 4 (electric motor), mounted as a traveling drive source.

The first clutch 3, the motor-generator 4, and the second clutch 5 configure a so-called one-motor two-clutch hybrid drive system, having, as main driving modes, an "EV mode," an "HEV mode," and a "WSC mode." The "EV mode" is an electric vehicle mode in which the first clutch 3 is released and the second clutch 5 is engaged, and in which the motor-generator 4 is the only drive source; traveling by this "EV mode" is referred to as "EV traveling". The "HEV mode" is a hybrid vehicle mode in which both clutches 3 and 5 are engaged, and in which the transverse engine 2 and the motor-generator 4 are the drive sources; traveling by the "HEV mode" is referred to as "HEV traveling." The "WSC mode" is a CL2 slip engagement mode in which the motor rotational speed of the motor-generator 4 is controlled in the "HEV mode" or the "EV mode," and the second clutch 5 is slip-engaged with an engagement torque capacity corresponding to a required driving force. When the vehicle is stopped, by setting the "WSC mode" in which the second clutch 5 is slip-engaged, it is possible to rotate the motor-generator 4.

The brake system of the FF hybrid vehicle comprises a brake operating unit 16, a brake fluid pressure control unit 17, left and right front wheel brake units 18R and 18L, and left and right rear wheel brake units 19R and 19L, as illustrated in FIG. 1. In the brake system, as the motor-generator 4 carries out regeneration at the time of a brake operation, a cooperative regenerative control is carried out with respect to the requested braking force based on a pedal operation, whereby the portion obtained by subtracting the regenerative braking force from the requested braking force is allotted to the hydraulic braking force.

The brake operating unit 16 comprises a brake pedal 16a, a negative pressure booster 16b which uses the intake negative pressure of the transverse engine 2, a master cylinder 16c, and the like. This regenerative cooperation brake unit 16 generates a predetermined master cylinder pressure according to a brake pedal stepping force from a driver that is applied to the brake pedal 16a, and is a simply configured unit that does not use an electric booster.

The brake fluid pressure control unit 17 comprises, while not shown, an electric oil pump, a pressure increasing solenoid valve, a pressure decreasing solenoid valve, an oil passage switching valve, and the like. By the control of the brake fluid pressure control unit 17 by a brake control unit 85, a function to generate a wheel cylinder hydraulic pressure when the brake is not operated, and a function to adjust the wheel cylinder hydraulic pressure when the brake is operated, are exerted. Examples of the controls that use the hydraulic pressure generation function when the brake is not operated include traction control (TCS control), vehicle behavior control (VDC control), emergency brake control (automatic brake control), and the like. Examples of controls that use the hydraulic pressure adjustment function at the time of a brake operation include cooperative regenerative control, anti-lock brake control (ABS control), and the like.

The left and right front wheel brake units 18R and 18L are respectively provided on the left and right front wheels 10R and 10L, and the left and right rear wheel brake units 19R and 19L are respectively provided on the left and right rear wheels 11R and 11L, and apply hydraulic braking force to each of the wheels. The brake units 18R, 18L, 19R, and 19L are provided with wheel cylinders, which are not shown, to which the brake fluid pressure produced by the brake fluid pressure control unit 17 is supplied.

The power supply system of the FF hybrid vehicle is provided with a high-capacity battery 21 as the motor-generator 4 power source, and a 12V battery 22 as a 12V system load power source, as illustrated in FIG. 1.

The high-capacity battery 21 is a secondary battery that is mounted as a power source of the motor-generator 4, and, for example, a lithium ion battery, in which a cell module configured with numerous cells is set inside a battery pack case, is used therefor. A junction box which aggregates a relay circuit for carrying out supply/cutoff/distribution of heavy current is built into the high-capacity battery 21, and further attached thereto are a cooling fan unit 24 having a battery cooling function, and a lithium battery controller 86 that monitors the battery state of charge (battery SOC) and the battery temperature.

The high-capacity battery 21 and the motor-generator 4 are connected to the DC harness 25 and the inverter 26 via the AC harness 27. A motor controller 83 for performing powering/regeneration control is attached to the inverter 26. That is, the inverter 26 converts the direct current from the DC harness 25 to a three-phase alternating current to the AC harness 27 during powering, when the motor-generator 4 is driven by the discharge of the high-capacity battery 21. In addition, the inverter converts the three-phase alternating current from the AC harness 27 to a direct current to the DC harness 25, during regeneration for charging the high-capacity battery 21 with the power generation by the motor-generator 4.

The 12V battery 22 is a secondary battery mounted as the power source of a 12V system load, including the starter motor and auxiliary machines; for example, a lead battery mounted on an engine vehicle or the like is used. The high-capacity battery 21 and the 12V battery 22 are connected via a DC branch harness 25a, a DC/DC converter 37, and a battery harness 38. The DC/DC converter 37 converts several hundred volts from the high-capacity battery 21 to 12V, which is configured to manage the charging amount of the 12V battery 22 by controlling the DC/DC converter 37 with the hybrid control module 81.

The electronic control system of an FF hybrid vehicle comprises a hybrid control module 81 (abbreviated as: "HCM") as an electronic control unit that has an integrated control function to appropriately manage the energy consumption of the entire vehicle, as illustrated in FIG. 1. An engine control module 82 (abbreviated as: "ECM"), a motor controller 83 (abbreviated as: "MC"), and a CVT control unit 84 (abbreviated as "CVTCU"), are provided as other electronic control units. Furthermore, a brake control unit 85 (abbreviated as: "BCU") and a lithium battery controller 86 (abbreviated as: "LBC") are provided. These electronic control units 81, 82, 83, 84, 85, and 86 are connected so as to be capable of exchanging bidirectional information by a Controller Area Network ("CAN") communication line 90 and share information with each other.

The hybrid control module 81 carries out various integrated controls, based on input information from the other electronic control units 82, 83, 84, 85, and 86, and the ignition switch 91 and the like.

The engine control module 82 obtains input information from the hybrid control module 81, the engine rotation speed sensor 92, and the like. The engine control module carries out a start control, a fuel injection control, an ignition control, a fuel cut control, an engine idle rotation control, etc., of the transverse engine 2, based on these pieces of input information.

The motor controller 83 obtains input information from the hybrid control module 81, the motor rotational speed sensor 93, and the like. The motor controller carries out motor idle control, motor creep control, regeneration control, and powering control of the motor-generator 4, according to control commands to the inverter 26, based on these bits of input information.

The CVT control unit 84 obtains input information from the hybrid control module 81, the accelerator position opening amount sensor 94, the vehicle speed sensor 95, an inhibitor switch 96, an ATF oil temperature sensor 97, and the like. The CVT control unit carries out the engagement hydraulic pressure control of the first clutch 3, the engagement hydraulic pressure control of the second clutch 5, the shifting hydraulic pressure control of the belt-type continuously variable transmission 6 by the primary pressure and the secondary pressure, and the like by outputting control commands to the control valve unit 6d based on these bits of input information.

The brake control unit 85 obtains input information from the hybrid control module 81, the brake switch 98, the brake stroke sensor 99, and the like. The brake control unit outputs control commands to the brake fluid pressure control unit 17, based on these bits of input information. The brake control unit 85 carries out TCS control, VDC control, automatic brake control, cooperative regenerative control, ABS control, and the like.

The lithium battery controller 86 manages the battery SOC, the battery temperature, and the like for the high-capacity battery 21 based on input information from the battery voltage sensor 100, the battery temperature sensor 101, and the like.

Configuration of the Regenerative Speed Control Process

Figure 2:
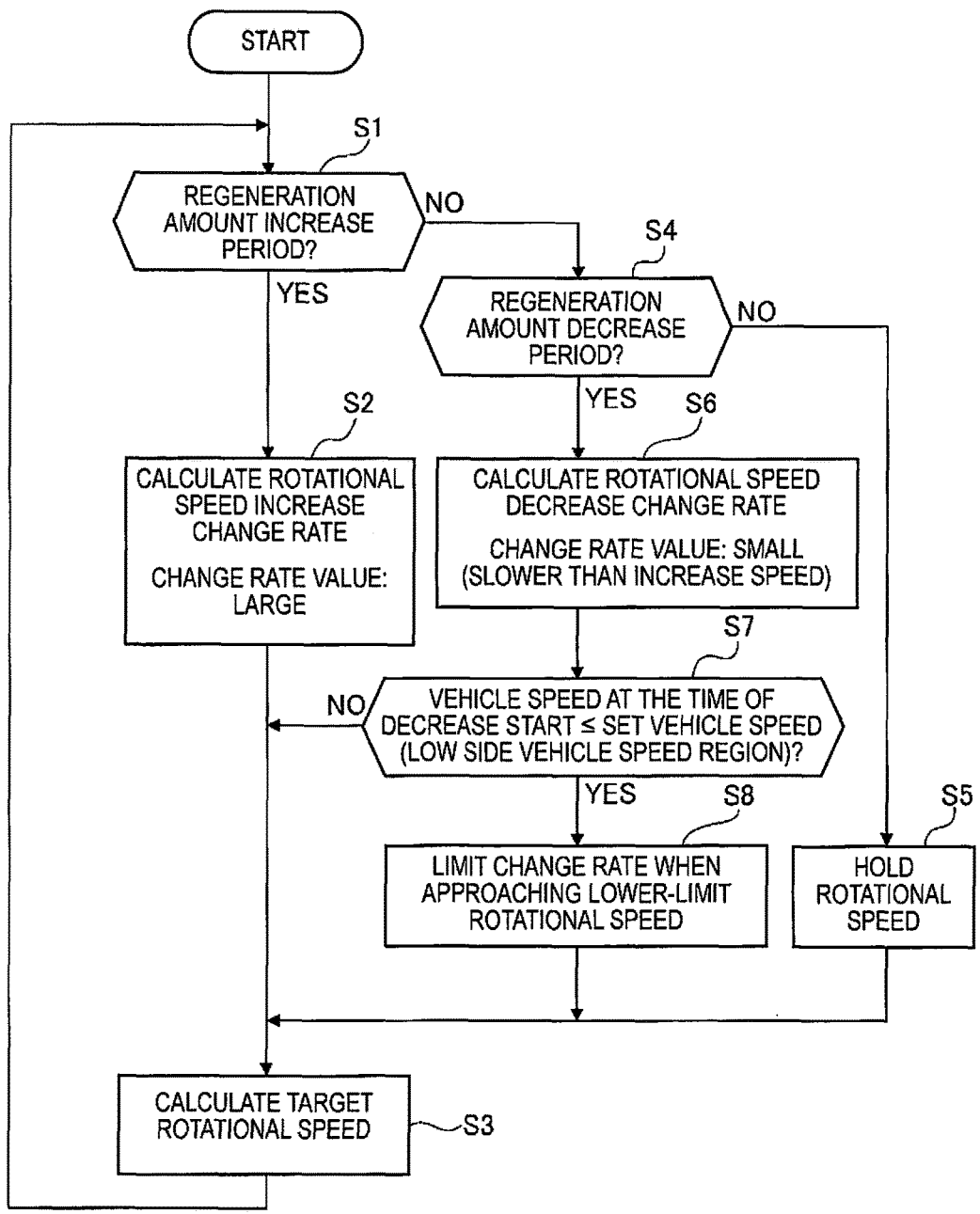
FIG. 2 is a flowchart illustrating a process for the regenerative speed control executed in the hybrid control module of the first embodiment.

FIG. 2 illustrates the flow of the regenerative speed control process that is executed in the hybrid control module 81 (controller) according to the first embodiment. Each step of FIG. 2 showing the configuration of the regenerative speed control process, which is started based on a request for an increase in the regeneration amount by a brake depression operation, and is ended when a Pri end command rotational speed (=transmission input rotational speed command value) reaches a lower-limit rotational speed by a decrease in the command value based on a request for a decrease in the regeneration amount by a brake return operation will be described below.

In Step S1, it is determined whether or not it is a regeneration amount increase period for increasing the Pri end command rotational speed of the belt-type continuously variable transmission 6, based on a request for an increase in the regeneration amount by a brake depression operation. If YES (it is a regeneration amount increase period), the process proceeds to Step S2, and if NO (it is not a regeneration amount increase period), the process proceeds to Step S4. Here, "request for an increase in the regeneration amount" is issued by a brake depression operation being carried out with the intention to decelerate, when the rotational speed of the motor-generator 4 and the main oil pump 14 are set to the lower-limit rotational speed, in coasting traveling brought about by releasing the accelerator pedal. In addition, the "regeneration amount increase period" refers to a period in which, when there is a request for an increase in the regeneration amount, downshifting of the belt-type continuously variable transmission 6 is started, and the Pri end command rotational speed is increased to a target rotational speed, which is determined by the best regenerative efficiency.

Figure 3:
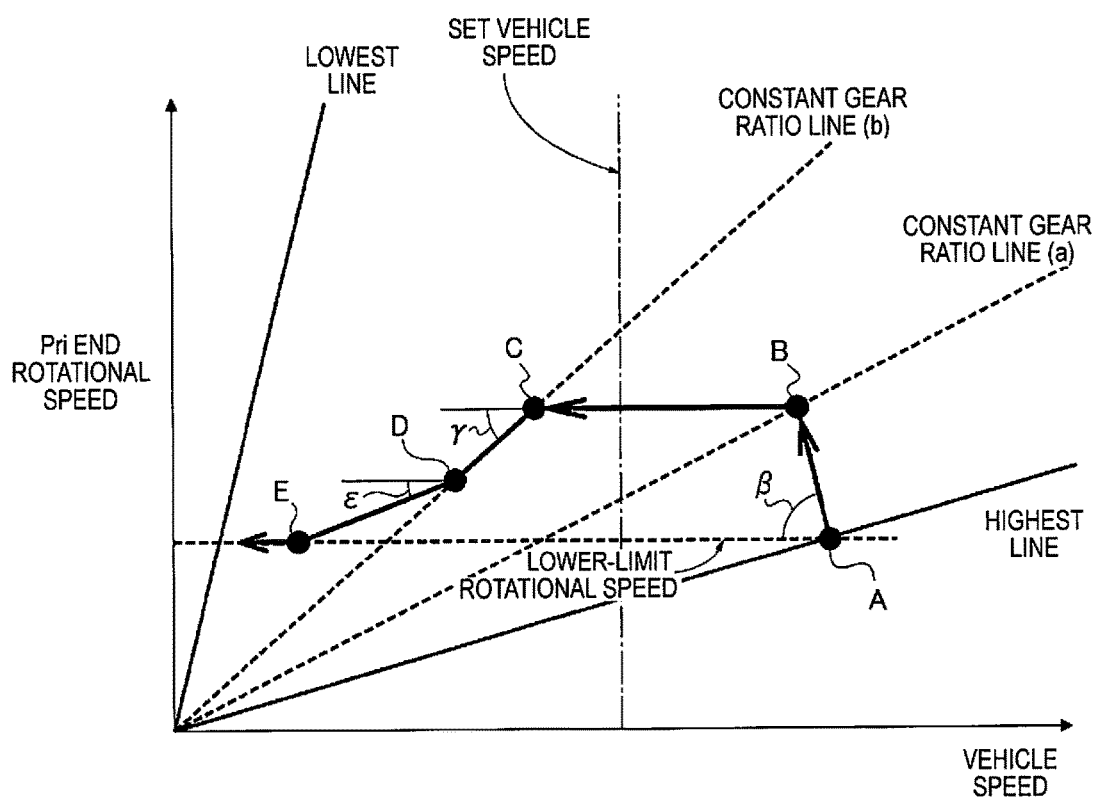
FIG. 3 is a shifting map illustrating calculated values of the rotational speed increase change rate and the calculated values of the rotational speed decrease change rate in the regenerative speed control process of the first embodiment.

In Step S2, following the determination in Step S1 that it is a regeneration amount increase period, the Pri end rotational speed increase change rate by downshifting the belt-type continuously variable transmission 6 (change rate value: large) is calculated, and the process proceeds to Step S3. Here, the "Pri end rotational speed increase change rate" is given as the increase change rate when the downshift speed of the belt-type continuously variable transmission 6 by the hydraulic pressure at that time is the maximum transmission speed. For example, in FIG. 3, when the operation point (VSP, APO), at the time when a request for an increase in the regeneration amount is issued, is point A on the highest line, an increase is caused rapidly from point A to point B reaching the target rotational speed, with a large change rate value β for rapidly increasing the Pri end command rotational speed. Incidentally, the "target rotational speed" is determined by the best regenerative efficiency. In addition, by setting the "Pri end rotational speed increase change rate" to a large change rate value β, a certain degree of overshoot occurs in the Pri end actual rotational speed in the point B arrival area; however, unlike in the case of an undershoot, an overshoot does not lead to a lack of oil amount, etc., and thus, is permitted.

Figure 4:
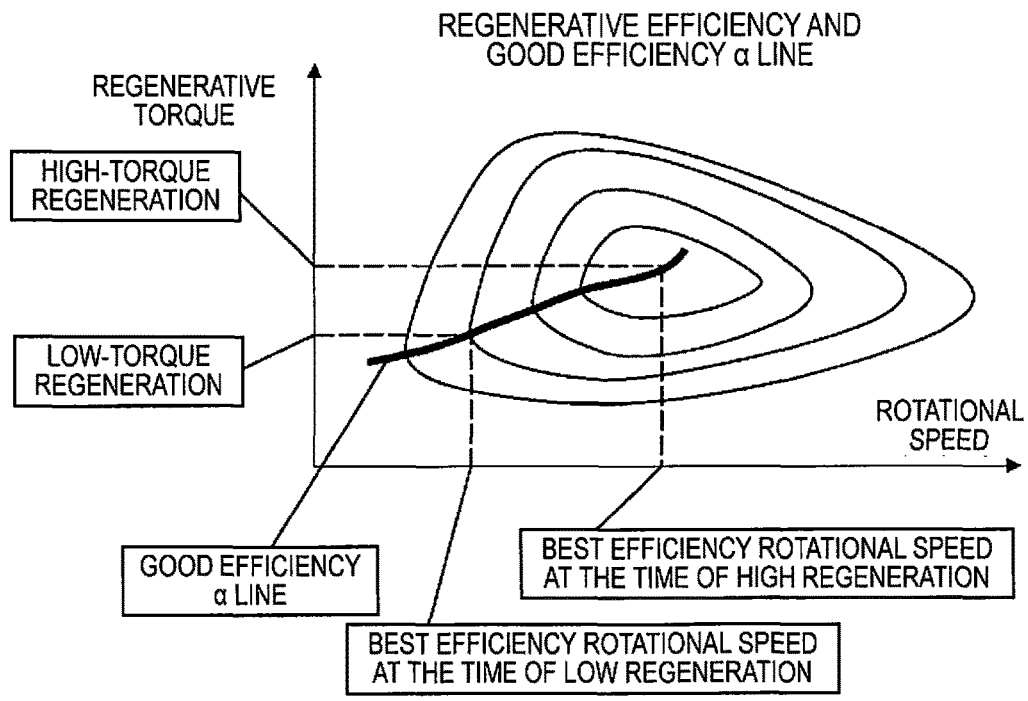
FIG. 4 is a characteristic diagram illustrating the regenerative efficiency and good fuel efficiency a line, which becomes the basis for determining the relationship between the rotational speed and the regenerative torque during regeneration, in the regenerative speed control process of the first embodiment.
Figure 5:
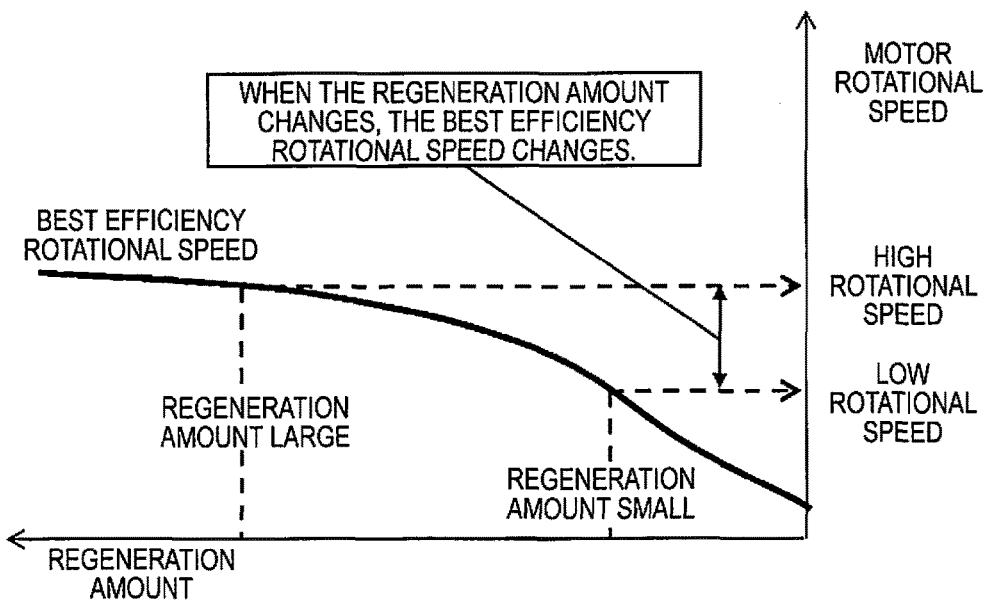
FIG. 5 is a relational characteristic diagram illustrating the relationship between the motor rotational speed and the regeneration amount by the best efficiency rotation for calculating the target rotational speed in the regenerative speed control process of the first embodiment.

In Step S3, following the calculation of the rotational speed increase change rate in Step S2, the target rotational speed of the Pri end rotational speed is calculated, and the process returns to Step S1. Here, the "target rotational speed in the regeneration amount increase period" shall be the Pri end rotational speed with which a target regeneration amount is obtained according to the best regenerative efficiency, when the maximum regeneration amount with respect to the deceleration request of the driver by a brake depression operation is set as the target regeneration amount. For example, the relationship between the regenerative torque and the rotational speed becomes the best regenerative efficiency when on the best efficiency a line, as illustrated in FIG. 4. This relationship is redrawn as the relationship between the regeneration amount and the motor rotational speed is the characteristic illustrated in FIG. 5; when the regeneration amount (=regenerative torque×motor rotational speed: target regeneration amount) is determined, the motor rotational speed that achieves the best regenerative efficiency (=Pri end rotational speed) is also determined. When the regeneration amount (=target regeneration amount) changes, the best regenerative efficiency rotational speed will also change. Regarding the "target rotational speed in the regeneration amount maintaining period", the Pri end rotational speed that is reached in the regeneration amount increase period is set as the target rotational speed. The "target rotational speed in the regeneration amount decrease period" shall be the lower-limit rotational speed, which is determined as the pump rotational speed of the main oil pump 14 for obtaining an oil amount for producing the necessary hydraulic pressure to the belt-type continuously variable transmission 6 during deceleration. Here, the "necessary hydraulic pressure" is the hydraulic pressure with which it is possible to shift during deceleration (low return shift) with a suitable CVT clamping force.

In Step S4, following the determination in Step S1 that it is not a regeneration amount increase period, it is determined whether or not it is a regeneration amount decrease period for decreasing the Pri end command rotational speed of the belt-type continuously variable transmission 6, based on a request for a decrease in the regeneration amount. If YES (it is a regeneration amount decrease period), the process proceeds to Step S6, and if NO (it is not a regeneration amount decrease period), the process proceeds to Step S5. Here, "request for a decrease in the regeneration amount" is issued by a brake return operation or a brake foot release operation being carried out, in a regenerative deceleration traveling scene brought about by a brake depression. In addition, the "regeneration amount decrease period" refers to a period in which, when there is a request for a decrease in the regeneration amount, the Pri end command rotational speed is decreased to a lower-limit rotational speed, by carrying out other than an upshift control, such as a constant transmission ratio control or a downshift control, as the shift control of the belt-type continuously variable transmission 6.

In Step S5, following the determination in Step S4 that it is a regeneration amount maintaining period, the change rate value of the Pri end rotational speed is set to zero, and the Pri end rotational speed is held by downshifting the belt-type continuously variable transmission 6 according to the decrease in the vehicle speed, and the process proceeds to Step S3. For example, in FIG. 3, when reaching the target rotational speed at point B, the change rate value of the Pri end rotational speed is set to zero from point B to point C, and by downshifting the belt-type continuously variable transmission 6 according to the decrease in the v, the Pri end rotational speed is maintained at the target rotational speed.

In Step S6, following the determination in Step S4 that it is a regeneration amount decrease period, the Pri end rotational speed decrease change rate accompanying the decrease in vehicle speed when the belt-type continuously variable transmission 6 maintains the transmission ratio (change rate value: small) is calculated, and the process proceeds to Step S7. Here, the "Pri end rotational speed decrease change rate" is given as the decrease change rate when the transmission ratio of the belt-type continuously variable transmission 6 at that time is maintained, and the Pri end command rotational speed is decreased along the constant gear ratio line according to the decrease in the vehicle speed. For example, in FIG. 3, when the Pri end command rotational speed starts to decrease at point C, the change rate value is set to a small change rate value T with which the Pri end command rotational speed is decreased with a gentle slope along the constant gear ratio line (b), from point C to point D.

In Step S7, following the calculation of the rotational speed decrease change rate in Step S6, it is determined whether or not the vehicle speed at the time of decrease start is in a low vehicle speed region on the low gear ratio side below a set vehicle speed. If YES (vehicle speed at the time of decrease start≤set vehicle speed), the process proceeds to Step S8, and if NO (vehicle speed at the time of decrease start>set vehicle speed), the process proceeds to Step S3. Here, the "set vehicle speed" is set to a value on the low vehicle speed side (low gear ratio side) at which impact begins to be received from a pull-in of the transmission input rotational speed, to which the regenerative torque is being given when decreasing the Pri end rotational speed along the constant gear ratio line.

In Step S8, following the determination in Step S7 that the vehicle speed at the time of decrease start≤set vehicle speed, when approaching the lower-limit rotational speed, the rotational speed decrease change rate in Step S6 is set to an even smaller limit rotational speed decrease change rate, and the process proceeds to Step S3. Here, the "limit rotational speed decrease change rate" shall be the rotational speed decrease change rate that is obtained by switching from the constant gear ratio line to the down gear ratio line, when the Pri end actual rotational speed becomes equal to or less than a set rotational speed, which approaches the lower-limit rotational speed. For example, in FIG. 3, when reaching point D when the Pri end actual rotational speed becomes the set rotational speed, the change rate value is set to a small change rate value ε, with which the Pri end command rotational speed is decreased along the down gear ratio line, from point D to point E (lower-limit rotational speed reaching point).

Next, the actions are described. The "action of the regenerative speed control process", "action of the regenerative speed control", and the "feature action of the regenerative speed control" will be separately described, regarding the actions of the regenerative speed control device for FF hybrid vehicles according to the first embodiment.

Action of the Regenerative Speed Control Process

The action of the regenerative speed control process will be described below, based on the flowchart of FIG. 2.

During a regeneration amount increase period based on a brake depression operation, a flow that progresses from Step S1→Step S2→Step S3 in the flowchart of FIG. 2 is repeated. In Step S2, a Pri end rotational speed increase change rate by downshifting the belt-type continuously variable transmission 6 (change rate value: large) is calculated. In Step S3, the Pri end rotational speed for obtaining the regeneration amount according to the best regenerative efficiency is calculated as the target rotational speed. That is, during the regeneration amount increase period, the Pri end rotational speed increase change rate is set to the change rate value β, to carry out a downshift control of the belt-type continuously variable transmission 6 whereby the Pri end command rotational speed of the belt-type continuously variable transmission 6 is quickly increased from the lower-limit rotational speed to the target rotational speed.

During a regeneration amount maintaining period based on a maintaining operation of the brake depression amount, a flow that progresses from Step S1→Step S4→Step S5→Step S3 in the flowchart of FIG. 2 is repeated. In Step S5, the change rate value of the Pri end rotational speed is set to zero, and the Pri end rotational speed of the belt-type continuously variable transmission 6 is held. In Step S3, the Pri end rotational speed reached during the regeneration amount increase period is calculated as the target rotational speed. That is, during a regeneration amount maintaining period, the Pri end rotational speed increase change rate is set to zero, to carry out a down shift control of the belt type continuously variable transmission 6 whereby shifting progresses in accordance with the decrease in the vehicle speed, so as to hold the Pri end command rotational speed.

During a regeneration amount decrease period based on a brake return operation and when the vehicle speed at the time of decrease start exceeds the set vehicle speed, a flow that progresses from Step S1→Step S4→Step S6→Step S7→Step S3 in the flowchart of FIG. 2 is repeated. In Step S6, a Pri end rotational speed decrease change rate accompanying the decrease in vehicle speed when the belt-type continuously variable transmission 6 maintains the transmission ratio (change rate value: small) is calculated. In Step S3, the lower-limit rotational speed, which is the rotational speed of the main oil pump 14 that produces the necessary hydraulic pressure to the belt-type continuously variable transmission 6 at the time of an accelerator pedal foot release, is calculated as the target rotational speed. That is, during the regeneration amount decrease period when the vehicle speed at the time of decrease start>set vehicle speed, the Pri end rotational speed decrease change rate is set to the change rate value γ, to carry out a transmission ratio maintenance control of the belt type continuously variable transmission 6 whereby the Pri end command rotational speed of the belt-type continuously variable transmission 6 is decreased from the target rotational speed to the lower-limit rotational speed with a gentle slope.

On the other hand, during a regeneration amount decrease period based on a brake return operation, and when the vehicle speed at the time of decrease start is equal to or less than the set vehicle speed, a flow that progresses from Step S1→Step S4→Step S6→Step S7→Step S8→Step S3 in the flowchart of FIG. 2 is repeated. In Step S8, when approaching the lower-limit rotational speed, the rotational speed decrease change rate in Step S6 is set to an even smaller limit rotational speed decrease change rate. That is, during the regeneration amount decrease period when the vehicle speed at the time of decrease start≤set vehicle speed, the Pri end rotational speed decrease change rate is switched from the change rate value γ to the change rate value ε(<γ), to carry out a down shift control of the belt-type continuously variable transmission 6 whereby the Pri end command rotational speed of the belt type continuously variable transmission 6 is decreased to the lower-limit rotational speed with a gentler slope.

Action of the Regenerative Speed Control

The "action of the regenerative speed control in a comparative example (FIG. 6)," "action of the regenerative speed control when vehicle speed at the time of decrease start>set vehicle speed (FIG. 7)" and "action of the regenerative speed control when vehicle speed at the time of decrease start≤set vehicle speed (FIG. 8)" will be separately described, with respect to the action of the regenerative speed control.

Figure 6:
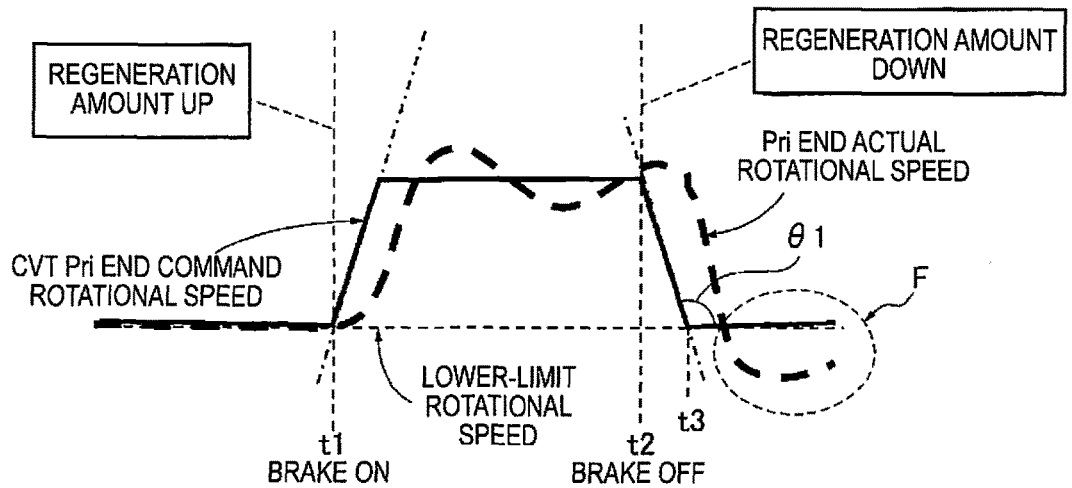
FIG. 6 is a time chart illustrating the characteristic of each of the Pri end command rotational speed and the Pri end actual rotational speed, with respect to the lower-limit rotational speed, when a regeneration amount increase (regeneration amount UP) by downshifting based on a brake depression operation, and a regeneration amount decrease (regeneration amount DOWN) by upshifting based on a brake return operation, are carried out in the regenerative speed control process of a comparative example.

Action of the Regenerative Speed Control in a Comparative Example: FIG. 6

If there is a request for an increase in the regeneration amount by a brake depression operation, and the transmission input rotational speed of the continuously variable transmission is to be increased, a downshift is carried out. On the other hand, the comparative example shall be configured such that, if there is a request for a decrease in the regeneration amount by a brake return operation, and the transmission input rotational speed of the continuously variable transmission is to be decreased, an upshift is carried out, contrary to when increasing. In the case of the comparative example, when an upshift is carried out when decreasing the transmission input rotational speed, the rotational speed decreases with a good response in the same manner as a downshift to increase the transmission input rotational speed, as illustrated by the Pri end command rotational speed characteristic after regeneration amount down time t2 in FIG. 6. That is, if the rotational speed decrease change rate of the transmission input rotational speed is increased, the Pri end command rotational speed reaches the lower-limit rotational speed in the short period of time from time t2 to time t3 in FIG. 6, and the opening angle θ1 intersecting with the lower-limit rotational speed becomes a small angle. In addition, if a feedback transmission control is carried out, in which the lower-limit rotational speed is set as the target rotational speed when the transmission input rotational speed is decreased, the follow-up response of the Pri end actual rotational speed (dashed line characteristic) with respect to the Pri end command rotational speed (solid line characteristic) is delayed. Consequently, when decreasing the transmission input rotational speed based on a regeneration stop request, undershooting occurs, in which the Pri end actual rotational speed falls below the lower-limit rotational speed, as illustrated by the characteristic in the area indicated by arrow F in FIG. 6.

Figure 7:
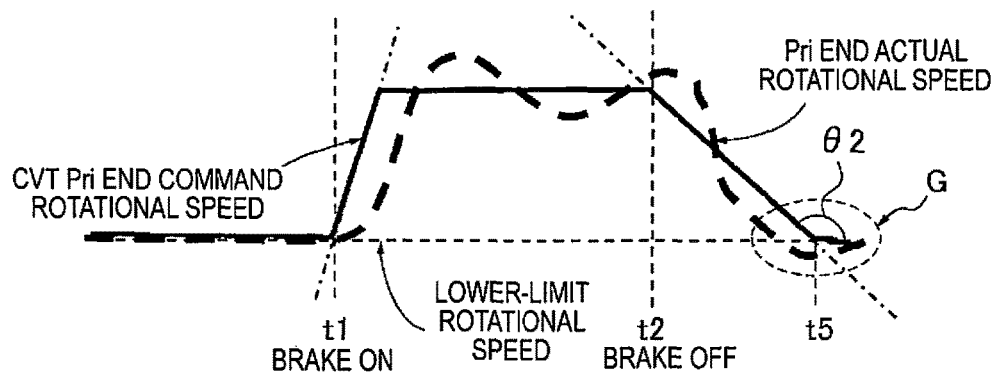
FIG. 7 is a time chart illustrating the characteristic of each of the Pri end command rotational speed and the Pri end actual rotational speed, with respect to the lower-limit rotational speed, when a regeneration amount increase (regeneration amount UP) by downshifting based on a brake depression operation, and a regeneration amount decrease (regeneration amount DOWN) along a constant gear ratio line based on a brake return operation, are carried out in the regenerative speed control process of the first embodiment.

Action of the Regenerative Speed Control when Vehicle Speed at the Time of Decrease Start>Set Vehicle Speed: FIG. 7

In contrast to the comparative example described above, in the first embodiment, during a regeneration amount decrease period when the vehicle speed at the time of decrease start>set vehicle speed, the Pri end rotational speed decrease change rate is set to the change rate value γ. Then, a transmission ratio maintenance control of the belt-type continuously variable transmission 6 is carried out, whereby the Pri end command rotational speed of the belt type continuously variable transmission 6 is decreased from the target rotational speed to the lower-limit rotational speed.

If a transmission ratio maintenance control is carried out when decreasing the Pri end command rotational speed from the target rotational speed to the lower-limit rotational speed in this manner, in contrast to downshifting, which increases the Pri end command rotational speed, the rotational speed is decreased gradually, as illustrated by the Pri end command rotational speed characteristic after time t2 in FIG. 7. That is, if the rotational speed decrease change rate of the Pri end command rotational speed is decreased, the Pri end command rotational speed reaches the lower-limit rotational speed requiring the time from time t2 to time t5 in FIG. 7, and the opening angle θ2 (>θ1) intersecting with the lower-limit rotational speed becomes a large angle. Therefore, while the follow-up response of the Pri end actual rotational speed (dashed line characteristic) with respect to the Pri end command rotational speed (solid line characteristic) is delayed by the feedback transmission control, when decreasing the Pri end rotational speed based on a regeneration stop request, generation of undershooting, in which the Pri end actual rotational speed falls below the lower-limit rotational speed, is suppressed, as illustrated by the characteristic in the area indicated by arrow G in FIG. 7.

Figure 8:
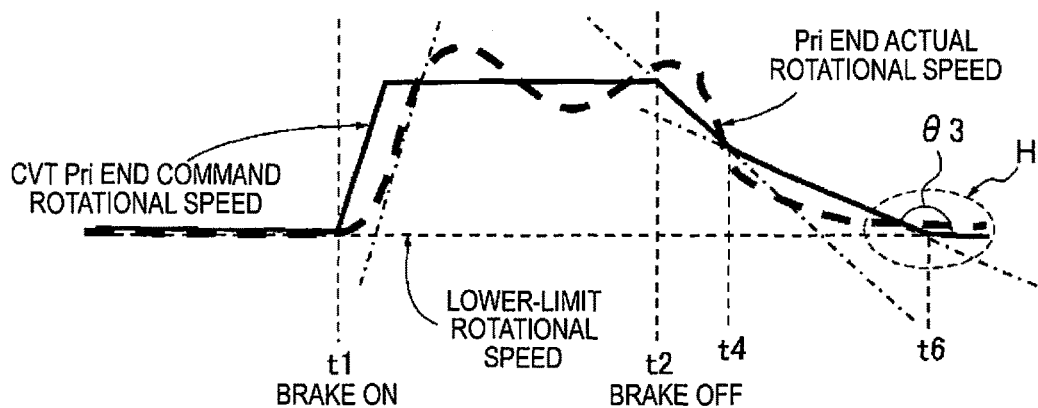
FIG. 8 is a time chart illustrating the characteristic of each of the Pri end command rotational speed and the Pri end actual rotational speed, with respect to the lower-limit rotational speed, when a regeneration amount increase (regeneration amount UP) by downshifting, and a regeneration amount decrease (regeneration amount DOWN) along a constant gear ratio line and a downshift line based on a brake return operation, are carried out in the regenerative speed control process of the first embodiment.

Action of the Regenerative Speed Control when Vehicle Speed at the Time of Decrease Start≤Set Vehicle Speed: FIG. 8

In contrast to the comparative example described above, in the first embodiment, during a regeneration amount decrease period when the vehicle speed at the time of decrease start≤set vehicle speed, the Pri end rotational speed decrease change rate is switched from the change rate value γ to the change rate value ε(<γ). Then, a downshift control of the belt-type continuously variable transmission 6 is carried out, whereby the Pri end command rotational speed of the belt-type continuously variable transmission 6 is decreased to the lower-limit rotational speed.

If a switching to a down shift control is carried out when decreasing the Pri end command rotational speed from the target rotational speed to the lower-limit rotational speed in this manner, in contrast to downshifting which increases the Pri end command rotational speed, the rotational speed is decreased gradually, as illustrated by the Pri end command rotational speed characteristic after time t2 in FIG. 8. That is, since the rotational speed decrease change rate of the Pri end command rotational speed is further decreased from time t4, the Pri end command rotational speed reaches the lower-limit rotational speed requiring a long time from time t2 to time t6 in FIG. 8, and the opening angle θ3 (>θ2>θ1) intersecting with the lower-limit rotational speed becomes a large angle. Therefore, while the follow-up response of the Pri end actual rotational speed (dashed line characteristic) with respect to the Pri end command rotational speed (solid line characteristic) is delayed by the feedback transmission control, when decreasing the Pri end rotational speed based on a regeneration stop request, generation of undershooting, in which the Pri end actual rotational speed falls below the lower-limit rotational speed, is suppressed, as illustrated by the characteristic in the area indicated by arrow H in FIG. 8.

Feature Action of the Regenerative Speed Control

The first embodiment was configured to perform a control for making the rotational speed decrease change rate of the Pri end command rotational speed lower than the rotational speed increase change rate of the Pri end command rotational speed, when the Pri end command rotational speed is being decreased based on a request for a decrease in the regeneration amount during regenerative speed control. That is, when decreasing the Pri end command rotational speed based on a request for a decrease in the regeneration amount, the decrease occurs with a more gentle slope compared to when increasing the Pri end command rotational speed, and reaches the lower-limit rotational speed with an opening angle that intersects the lower-limit rotational speed forming a large angle. Therefore, even if there is a follow-up response due to a feedback transmission control, it is possible to suppress undershooting, in which the Pri end actual rotational speed falls below the lower-limit rotational speed. Therefore, when decreasing the transmission input rotational speed based on a request for a decrease in the regeneration amount during regenerative speed control, it is possible to suppress undershooting, in which the Pri end actual rotational speed falls below the lower-limit rotational speed. In this manner, as a result of suppressing undershooting of the Pri end actual rotational speed, the problem from the point of view of protecting the CVT function, such as lacking in the oil amount due to a decrease in the rotational speed of the main oil pump 14, can be solved.

The first embodiment was configured to carry out a shift control by other than an upshift control, as the shift control of the belt-type continuously variable transmission 6, when there is a request for a decrease in the regeneration amount during regenerative speed control. That is, downshift is carried out when the Pri end command rotational speed of the belt-type continuously variable transmission 6 is increased based on a regeneration start request, and a downshift is also carried out when maintaining the Pri end command rotational speed. Consequently, when it is switched to upshifting when increasing the Pri end command rotational speed, the operations of the valves that supply hydraulic pressure to the primary oil chamber and the secondary oil chamber are reversed, and it will go too far on the upshift side in excess of the target transmission ratio due to a valve response delay. The Pri end actual rotational speed falls below the lower-limit rotational speed due to this excess upshifting, which promotes undershooting. Therefore, by carrying out other than an upshift control, such as a constant transmission ratio control or a downshift control, when decreasing the Pri end command rotational speed, undershooting that accompanies an upshift for switching the direction of change of the transmission ratio is suppressed.

In the first embodiment, when there is a request for a decrease in the regeneration amount during regenerative speed control, the Pri end command rotational speed is decreased along the constant gear ratio line of the belt-type continuously variable transmission 6. Then, when the Pri end command rotational speed approaches the lower-limit rotational speed, a control to decrease the Pri end command rotational speed by switching from a constant gear ratio line to a down gear ratio line is carried out. That is, if the Pri end command rotational speed is decreased along the constant gear ratio line of the belt-type continuously variable transmission 6, there are situations in which the opening angle that intersects the lower-limit rotational speed does not become a sufficiently large angle. Even in such a situation, if switched from a constant gear ratio line to a down gear ratio line, a sufficiently large angle is secured as the opening angle that intersects the lower-limit rotational speed. Therefore, when decreasing the Pri end command rotational speed, it is possible to suppress undershooting, in which the Pri end actual rotational speed falls below the lower-limit rotational speed, regardless of the decrease start conditions.

The first embodiment was configured to carry out a control to decrease the transmission input rotational speed by switching from a constant gear ratio line to a down gear ratio line, when the operation point (VSP, APO) at the time of decrease start is in the low gear ratio side region. For example, when the operation point (VSP, APO) is in a low transmission ratio vehicle speed region, such as when the vehicle speed at the time of decrease start≤set vehicle speed, the influence to pull in and reduce the Pri end actual rotational speed becomes strong, due to the regenerative torque that acts on the input shaft of the belt type continuously variable transmission 6. Therefore, when a condition is met, in which the influence to decrease the Pri end actual rotational speed is strong it is possible to suppress undershooting, in which the Pri end actual rotational speed falls below the lower-limit rotational speed.

Next, the effects are described. The effects listed below can be obtained with the regenerative speed control device for FF hybrid vehicles according to the first embodiment.

(1) In a vehicle (FF hybrid vehicle) having a continuously variable transmission (belt-type continuously variable transmission 6): an electric motor (motor-generator 4) connected to an input shaft side of the continuously variable transmission (belt-type continuously variable transmission 6) and that regenerates energy during deceleration; an oil pump (main oil pump 14) connected to the input shaft side of the continuously variable transmission (belt-type continuously variable transmission 6), in which a rotational speed for producing a necessary hydraulic pressure to the continuously variable transmission (belt type continuously variable transmission 6) during deceleration is set as the lower-limit rotational speed; a controller (hybrid control module 81) is provided which, when there is a request (brake depression operation) for an increase in the regeneration amount while decelerating, performs a regenerative speed control for downshifting the continuously variable transmission (belt-type continuously variable transmission 6) to the low gear ratio side, and increasing rotational speed of a transmission input shaft to which the electric motor (motor generator 4) is connected; and the controller (hybrid control module 81) performs a control for making the rotational speed decrease change rate of the transmission input rotational speed (Pri end command rotational speed) lower than the rotational speed increase change rate of the transmission input rotational speed (Pri end command rotational speed), when the transmission input rotational speed (Pri end command rotational speed) is decreased based on a request (brake return operation) for a decrease in the regeneration amount during regenerative speed control. Accordingly, when decreasing the transmission input rotational speed (Pri end command rotational speed) based on a request for a decrease in the regeneration amount during regenerative speed control, it is possible to suppress undershooting, in which the actual transmission input rotational speed (Pri end actual rotational speed) falls below the lower-limit rotational speed.

(2) When there is a request for a decrease in the regeneration amount during regenerative speed control, the controller (hybrid control module 81) carries out a shift control by other than an upshift control, as the shift control of the continuously variable transmission (belt-type continuously variable transmission 6). Accordingly, in addition to the effects of (1), by carrying out other than an upshift control, such as a constant transmission ratio control or a downshift control, when decreasing the transmission input rotational speed (Pri end command rotational speed), it is possible to suppress undershooting that accompanies an upshift for switching the direction of change of the transmission ratio. Specifically, when there is a request (brake pedal return operation) for a decrease in the regeneration amount during regenerative speed control and the transmission input rotational speed is decreased, if the transmission is upshifted giving consideration to the best regenerative efficiency, upshifting will switch to downshifting when the transmission input rotational speed reaches the lower-limit rotational speed. In this manner, when switching from upshifting to downshifting, that is, when the direction of shifting is reversed, there is the risk that the transmission input rotational speed undershoots and falls below the lower-limit rotational speed, due to a response delay of the transmission (hydraulic pressure response delay, mechanical response delay of the transmission mechanism). In contrast, as described above in (2), by carrying out a shift control other than an upshift control (maintaining (limiting) to the transmission ratio at that time, i.e., prohibit upshift) when there is a request (brake pedal return operation) for a decrease in the regeneration amount during regenerative speed control, the direction of shifting will not be reversed when the transmission input rotational speed reaches the lower-limit rotational speed, and it is possible to suppress the transmission input rotational speed from undershooting and falling below the lower-limit rotational speed.

(3) The controller (hybrid control module 81) carries out a control to decrease the transmission input rotational speed (Pri end command rotational speed) along a constant gear ratio line of the continuously variable transmission (belt-type continuously variable transmission 6), when there is a request for a decrease in the regeneration amount during regenerative speed control, and switches from the constant gear ratio line to a down gear ratio line, to decrease the transmission input rotational speed (Pri end command rotational speed), when the transmission input rotational speed (Pri end command rotational speed) approaches the lower-limit rotational speed. Accordingly, in addition to the effects of (2), when decreasing the transmission input rotational speed (Pri end command rotational speed), it is possible to suppress undershooting, in which the actual transmission input rotational speed (Pri end actual rotational speed) falls below the lower-limit rotational speed, regardless of the decrease start conditions. Specifically, as described above in (3), when decreasing the transmission input rotational speed, by downshifting when the transmission input rotational speed approaches the lower-limit rotational speed, it is possible to decrease the downshift change amount (change in the change rate of the downshift) when the transmission input rotational speed reaches the lower-limit rotational speed, and to prevent the transmission input rotational speed from undershooting and falling below the lower-limit rotational speed.

(4) The controller (hybrid control module 81) carries out a control to decrease the transmission input rotational speed by switching from a constant gear ratio line to a down gear ratio line, when the operation point (VSP, APO) at the time of decrease start is in the low gear ratio side region. Accordingly, in addition to the effects of (3), when a condition is met, in which the influence to decrease the actual transmission input rotational speed (Pri end actual rotational speed) is strong, it is possible to suppress undershooting, in which the (actual transmission input rotational speed (Pri end actual rotational speed) falls below the lower-limit rotational speed.

The vehicle regenerative speed control device of the present invention was described above based on the first embodiment, but specific configurations thereof are not limited to the first embodiment, and various modifications and additions to the design can be made without departing from the scope of the invention according to each claim.

In the first embodiment, an example was shown in which, when there is a request for a decrease in the regeneration amount during regenerative speed control, the shift control of the belt type continuously variable transmission 6 is carried out by a constant gear ratio control when the vehicle speed at the time of decrease start>set vehicle speed, and carried out by a control that combines a constant gear ratio control and a downshift control when the vehicle speed at the time of decrease start≤set vehicle speed. However, a constant gear ratio control may be carried out as the shift control of the continuously variable transmission, regardless of the vehicle speed condition or the gear ratio condition, when there is a request for a decrease in the regeneration amount during regenerative speed control. In addition, a control that combines a constant gear ratio control and a down shift control may be carried out as the shift control of the continuously variable transmission, regardless of the vehicle speed condition or the gear ratio condition, when there is a request for a decrease in the regeneration amount during regenerative speed control. Furthermore, a down shift control may be carried out as the shift control of the continuously variable transmission, regardless of the vehicle speed condition or the gear ratio condition, when there is a request for a decrease in the regeneration amount during regenerative speed control.

In the first embodiment, an example was shown in which a belt-type continuously variable transmission 6, in which a belt 6c is wound around a primary pulley 6a and a secondary pulley 6b, and the primary pulley pressure Ppri and the secondary pulley pressure Psec are the shifting hydraulic pressure, is used as the continuously variable transmission. However, the continuously variable transmission may be an example that uses a toroidal-type of continuously variable transmission as well.

Figure 9:
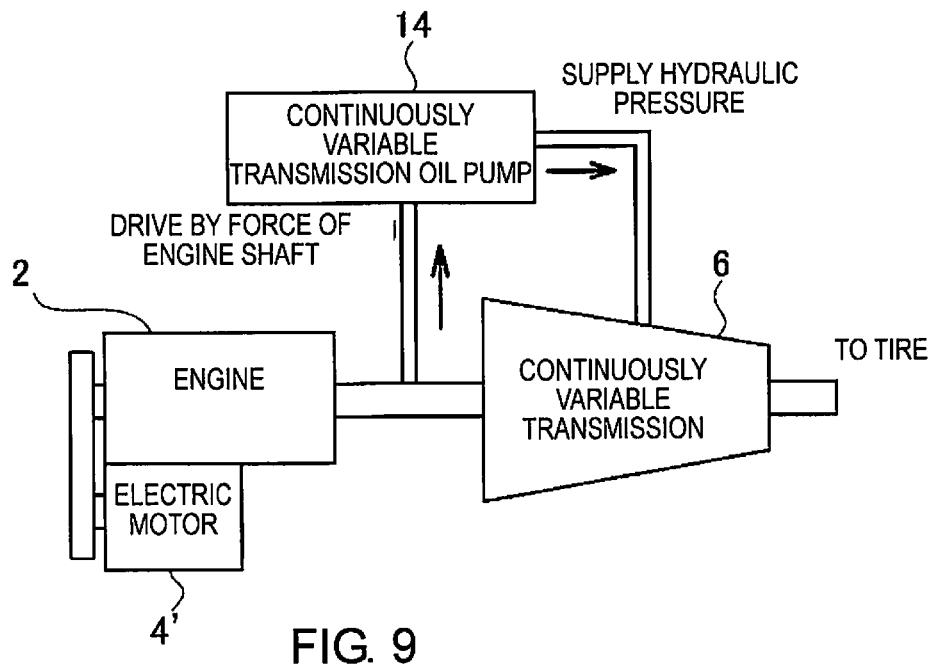
FIG. 9 is a schematic diagram illustrating an example of a drive system of an engine-equipped vehicle to which the regenerative speed control of the present invention can be applied.
Figure 10:
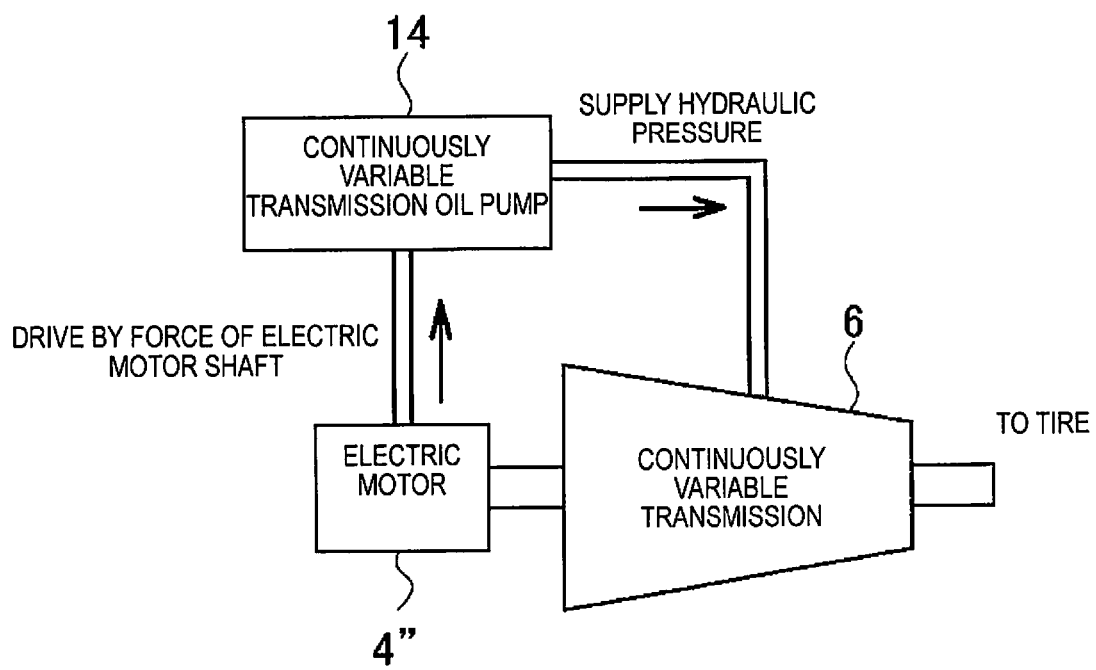
FIG. 10 is a schematic diagram view illustrating an example of a drive system of an electric vehicle to which the regenerative speed control of the present invention can be applied.

In the first embodiment, an example was shown in which the regenerative speed control device of the present invention is applied to an FF hybrid vehicle according to a one-motor and two-clutch drive system. However, the regenerative speed control device of the present invention can be applied to an FR hybrid vehicle, or a hybrid vehicle other than a one-motor two-clutch drive type, such as a direct coupling system of an engine and a motor, or a power split mechanism. Furthermore, the device can be applied to any vehicle provided with a continuously variable transmission oil pump 14, such as an engine-equipped vehicle, in which a motor-generator 4 is added to the crankshaft, as illustrated in FIG. 9. Additionally, the device can be applied to an electric vehicle (including fuel cell vehicles) that are driven by a motor-generator 4, as illustrated in FIG. 10.

The invention claimed is:

1. A vehicle regenerative speed control device for a vehicle having a continuously variable transmission, an electric motor connected to an input shaft side of the continuously variable transmission and that regenerates energy during vehicle deceleration, and an oil pump connected to the input shaft side of the continuously variable transmission, in which a rotational speed for producing a necessary hydraulic pressure to the continuously variable transmission during vehicle deceleration is set as a lower-limit rotational speed;

the vehicle regenerative speed control device comprising
a controller configured to perform a regenerative speed control for downshifting the continuously variable transmission to a low gear ratio side and increasing a transmission input rotational speed of a transmission input shaft to which the electric motor is connected upon receiving a request for an increase in a regeneration amount during vehicle deceleration;
the controller being further configured to perform a control for making a rotational speed decrease change rate of the transmission input rotational speed lower than a rotational speed increase change rate of the transmission input rotational speed, when the transmission input rotational speed is decreased based on a request for a decrease in the regeneration amount during the regenerative speed control.

2. The vehicle regenerative speed control device according to claim 1, wherein
the controller carries out a shift control by other than an upshift control, as the shift control for the continuously variable transmission upon receiving a request for a decrease in the regeneration amount during the regenerative speed control.

3. The vehicle regenerative speed control device according to claim 2, wherein
the controller carries out a control to decrease the transmission input rotational speed along a constant gear ratio line of the continuously variable transmission, upon receiving the request for the decrease in the regeneration amount during the regenerative speed control, and switches from the constant gear ratio line to a down gear ratio line to decrease the transmission input rotational speed, when the transmission input rotational speed approaches the lower-limit rotational speed.

4. The vehicle regenerative speed control device according to claim 3, wherein
the controller carries out a control to decrease the transmission input rotational speed by switching from the constant gear ratio line to the down gear ratio line upon a condition that an operation point at the time of starting vehicle speed decrease is in a low gear ratio side region.

* * * * *